(12) United States Patent
Martenis (10) Patent No.: US 9,552,564 B1
(45) Date of Patent: Jan. 24, 2017

(54) AUTONOMOUS DELIVERY TRANSPORTATION NETWORK

(71) Applicant: Amazon Technologies, Inc., Seattle, WA (US)

(72) Inventor: Christopher Charles Martenis, Reston, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/663,001

(22) Filed: Mar. 19, 2015

(51) Int. Cl.
*G06Q 10/08* (2012.01)
*G07C 5/00* (2006.01)
*E05F 15/77* (2015.01)

(52) U.S. Cl.
CPC ............ *G06Q 10/083* (2013.01); *E05F 15/77* (2015.01); *G07C 5/008* (2013.01)

(58) Field of Classification Search
CPC ......... G06Q 10/083; E05F 15/77; G07C 5/008
See application file for complete search history.

(56) References Cited

U.S. PATENT DOCUMENTS

| | | | | |
|---|---|---|---|---|
| 9,082,144 B2 * | 7/2015 | Jones | ................. | G06Q 30/0611 |
| 2005/0187836 A1 * | 8/2005 | Wolfe | ................. | G06Q 10/087 |
| | | | | 705/28 |
| 2009/0313095 A1 * | 12/2009 | Hurpin | ...................... | E04H 6/14 |
| | | | | 705/13 |
| 2011/0208667 A1 * | 8/2011 | Mackenzie | ........ | G01C 21/3469 |
| | | | | 705/336 |
| 2013/0125778 A1 * | 5/2013 | LaCabe | .................. | B61B 13/00 |
| | | | | 104/130.01 |
| 2014/0164126 A1 * | 6/2014 | Nicholas | ................... | A63F 9/24 |
| | | | | 705/14.58 |
| 2014/0195214 A1 * | 7/2014 | Kozloski | ............. | G06F 17/5009 |
| | | | | 703/8 |
| 2014/0279665 A1 * | 9/2014 | Lievens | ................. | G06Q 10/02 |
| | | | | 705/339 |
| 2015/0006005 A1 * | 1/2015 | Yu | ........................ | G05D 1/0297 |
| | | | | 701/22 |
| 2015/0120094 A1 * | 4/2015 | Kimchi | ................. | B64C 39/024 |
| | | | | 701/3 |
| 2015/0186869 A1 * | 7/2015 | Winters | ............. | G06Q 20/3255 |
| | | | | 705/26.81 |

(Continued)

*Primary Examiner* — Rodney Butler
(74) *Attorney, Agent, or Firm* — Thomas | Horstemeyer, LLP; Michael J. D'Aurelio; Jason M. Perilla (57) ABSTRACT

Aspects of an autonomous delivery transportation network for the delivery of items are described. The network includes a central management system that directs the operation of a network of vehicles for delivering items. In one embodiment, the system receives a request for transportation including a pickup location, a delivery location, and item attribute data. The system analyzes the existing service routes of vehicles in the network to identify a vehicle compatible with the request. The system also estimates a delay to the existing service route of the vehicle with reference to the pickup and delivery locations and, when determining that the delay is acceptable, assigns the vehicle to service the request. When determining that the delay is unacceptable, the system may dispatch a new vehicle to join the network. The system may also communicate various aspects of service, such as estimated pickup and/or drop off times, to client devices.

20 Claims, 6 Drawing Sheets

(56) References Cited

U.S. PATENT DOCUMENTS

| | | | |
|---|---|---|---|
| 2015/0202770 A1* | 7/2015 | Patron | G05D 1/024 700/245 |
| 2015/0219464 A1* | 8/2015 | Beaurepaire | G01C 21/3617 701/538 |
| 2015/0278759 A1* | 10/2015 | Harris | G06Q 10/08355 705/338 |
| 2015/0345967 A1* | 12/2015 | Meuleau | G01C 21/3453 701/25 |
| 2015/0345971 A1* | 12/2015 | Meuleau | G01C 21/3492 701/25 |
| 2015/0363843 A1* | 12/2015 | Loppatto | G06Q 10/083 705/330 |
| 2015/0373086 A1* | 12/2015 | Hunt | H04L 67/10 709/201 |
| 2016/0012390 A1* | 1/2016 | Skaaksrud | H04W 12/06 705/332 |
| 2016/0037478 A1* | 2/2016 | Skaaksrud | H04W 12/06 455/456.1 |

* cited by examiner

AUTONOMOUS DELIVERY TRANSPORTATION NETWORK

BACKGROUND

The transportation needs in most urban and suburban areas continues to grow. Among others, such transportation needs include the needs of individuals to commute to and from work, school, retail outlets, and other locations. The transportation needs also include the need to transport items among various locations. In an aim to satisfy these needs, some municipalities have established public transportation systems that may be relied upon by residents for transportation among certain locations. The public transportation systems generally make use of vehicles, such as buses, to transport individuals among stops along a predetermined route at predetermined times.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

As noted above, the transportation needs in most urban and suburban areas continues to grow. Among others, such transportation needs include the needs of individuals to commute to and from work, school, retail outlets, and other locations, as well as the need to transport items among various locations. In an aim to satisfy these needs, some municipalities have established public transportation systems that may be relied upon by residents for transportation among certain locations. However, such public transportation systems generally make use of vehicles that follow predetermined routes at predetermined times. As such, these public transportation systems, while fulfilling some needs, come with some significant drawbacks for passengers. For example, the public transportation systems offer relatively little flexibility in pickup and drop off locations for passengers and/or cargo. In many cases, passengers may not even be within walking distance of a service location for the system. Further, the scheduled pickup or drop off times may be unsuitable or, at best, very inconvenient.

In that context, aspects and embodiments of autonomous transportation networks are described herein. The autonomous transportation networks address many of the problems discussed above by offering on-demand transportation service to and from nearly any location accessible by way of surface streets. A central management system of such a transportation network may be configured to optimize routes of several vehicles in a network of transportation vehicles, for efficiency, while accounting for service level parameters that vary over time. Vehicles may be added to and removed from the network of vehicles based on current service demands, avoiding wasted resources when demand is low. Further, in addition to transporting passengers, the autonomous transportation networks may also be relied upon to transport tangible items, goods, groceries, etc.

Figure 1:
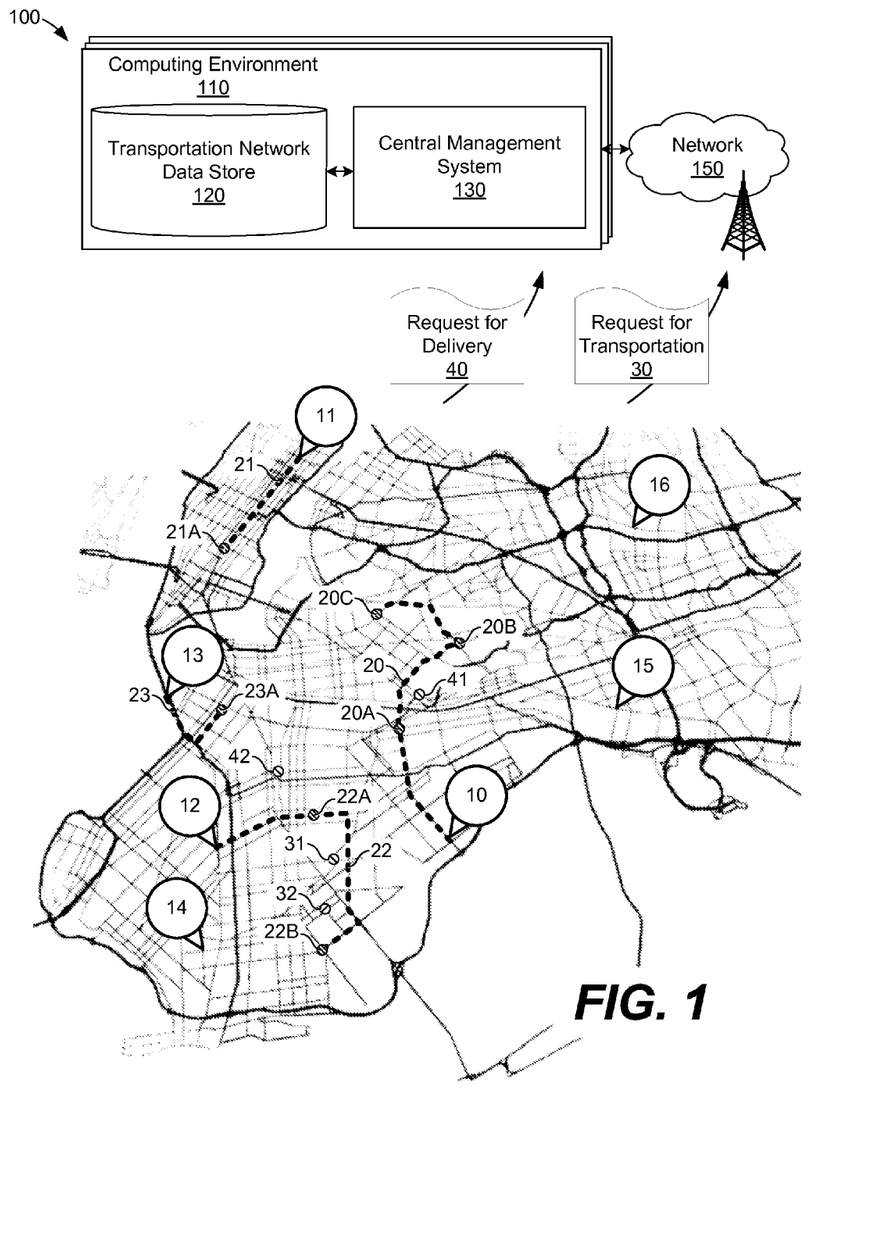
FIG. 1 illustrates a networked environment for autonomous transportation according to various example embodiments of the present disclosure.

FIG. 1 illustrates a networked environment 100 for autonomous transportation according to example embodiments of the present disclosure, along with a map for discussion of the embodiments. The networked environment 100 includes a computing environment 110, a network 150, and vehicles 10-16 illustrated at various locations on the map. As shown in FIG. 1, the computing environment 110 includes a transportation network data store 120 and a central management system 130.

The vehicles 10-16 may be embodied as any type of vehicle, including but not limited to bikes, carriages, cars, trucks, vans, buses, aircraft, etc., regardless of how powered or driven. Collectively, the vehicles 10-16 may be referred to as a network of transportation vehicles. Each of the vehicles 10-16 includes an autonomous vehicle controller that controls its maneuvering operations on surface streets, highways, skyways, parking lots, etc. The autonomous vehicle controllers of the vehicles 10-16 are in communication with the central management system 130 via the network 150, and receive pickup, drop off, delivery, and other waypoint or similar location information by which to determine service routes.

The vehicles 10-16 may be relied upon to transport anything capable of being moved, including but not limited to individuals, tangible items, goods, groceries, etc. As illustrated in FIG. 1, the vehicles 10-13 are travelling, respectively, along routes 20-23. Further, the route 20 includes stops 20A-20C, the route 21 includes stop 21A, the route 22 includes stops 22A and 22B, and the route 23 includes stop 23A. The vehicles 14-16 are not operating according to any particular routes and may be awaiting instructions from the central management system 130, for example. In that sense, the vehicles 14-16 may be considered available or unallocated resources of the network of transportation vehicles.

As described in further detail below, it is noted that the central management system 130 may receive telemetry data from each of the vehicles 10-16. The telemetry data may include operating parameter data associated with the vehicles 10-16, such as passenger and cargo capacity, existing service route data, planned stop data, fuel level and system diagnostic data, etc. This telemetry data may be stored in the transportation network data store 120 for reference by the central management system 130.

Before turning to a more detailed description of the individual components and operation of the networked environment 100 with reference to FIGS. 2 and 3A-3C, a concise description of the operation is described with reference to FIG. 1. In one example, using a client device, an individual may send a request for transportation 30 to the computing environment 110 via the network 150. Among other information, the request 30 may include a pickup location 31, a destination location 32, and a number of passengers. The pickup and destination locations 31 and 32 may be embodied in the form of geolocation information (e.g., latitude, longitude, etc.).

In response to the request 30, the central management system 130 is configured to identify one of the vehicles 10-16 which is compatible with the request 30. In that context, the central management system 130 may analyze the existing service routes of the vehicles 10-16 to identify one having an existing service route and passenger capacity compatible with the request 30. As used herein, an existing service route will be considered compatible with the request if the pickup and/or destination locations may be incorporated into the existing service route without causing excess delay to the already existing pickup and/or destination locations of the existing service route. Thus, the request may be compatible if the locations associated with the request are sufficiently proximate to or otherwise reachable by the vehicle on the existing service route so as to not cause a delay that exceeds a permissible delay pursuant to a service level agreement covering the existing service route. For example, the central management system 130 may identify the route 22 of the vehicle 12 as being compatible with the request 30, because the pickup and drop off locations 31 and 32 of the request 30 are substantially aligned with, proximate to, or along the existing route 22. Further, based on a comparison between the number of passengers in the request 30 and the available passenger capacity in the vehicle 20, the central management system 130 may identify the vehicle 12 as being compatible with (e.g., capable of handling) the request 30.

Once the vehicle 12 is identified by the central management system 130 as being compatible with the request 30, the central management system 130 may further determine whether the assignment of the vehicle 12 to the request 30 will cause an unsuitable delay to other passengers or cargo in the vehicle 12. It is noted that the vehicle 12 carries multiple passengers for drop off at stops 22A and 22B, and the central management system 130 is able to reference this information in the transportation network data store 120. Thus, in one aspect of the embodiments, the central management system 130 may estimate a delay to the existing service route 22 of the vehicle 12 based on the inclusion of the pickup and destination locations 31 and 32 in the route 22. For example, modifying the route 22 to include the pickup and destination locations 31 and 32 may cause the passenger destined for the destination location 32 to be delayed.

The central management system 130 may compare such delay in the route 22 with one or more service level parameters of the autonomous transportation network, to determine whether it is acceptable under the circumstances. If acceptable, the central management system 130 may assign the vehicle 12 to service the request 30 and communicate the pickup and drop off locations 31 and 32 to the vehicle 12. The vehicle 12 may then store the pickup and drop off locations 31 and 32 into a location queue memory and autonomously update the route 22 to incorporate the pickup and drop off locations 31 and 32. If unacceptable, the central management system 130 may seek another one of the vehicles 10-16 to service the request 30. For example, the central management system 130 may dispatch the vehicle 14 to service the request 30.

The service level parameters of the autonomous transportation network may be defined as maximum or minimum service delay times, for example, or other similar service level metrics. In other aspects, rather than or in addition to service delay times, the service level parameters may be related to operating and/or service charge costs, time of day, holiday, or event constraints, weather or meteorological conditions, road conditions, traffic, or other relevant factors. Thus, in addition to route compatibility, the central management system 130 may assign one of the vehicles 10-16 to the request 30 based on various operating and/or service level parameters.

If the vehicle 12 is identified by the central management system 130 and assigned to service the request 30, the central management system 130 is further configured to calculate an estimated pickup time until the vehicle 12 arrives at the pickup location 31. The central management system 130 may also communicate the estimated pickup time, along with an identifier of the vehicle 12, to a client device of the user that submitted the request 30. Thus, the user that submitted the request for transportation 30 may receive a confirmation that the vehicle 12 was assigned to fulfill his request, along with an estimated pickup time until the vehicle 12 is expected to arrive at the pickup location 31.

In other aspects of the embodiments, the central management system 130 may be configured to perform additional maintenance and/or housekeeping activities in the autonomous transportation network, such as verifying passengers, directing doors or compartments of the vehicles 10-16 to lock, unlock, or open under various circumstances, receiving, storing, and analyzing vehicle telemetry data from the vehicles 10-16, processing payment transactions for users, receiving and responding to maintenance requests from the vehicles 10-16, optimizing the routes of the vehicles 10-16 for efficiency and/or to adhere to service parameters, etc.

In still other aspects of the embodiments, a network of transportation vehicles may include one or more vehicles having compartments or cargo bays to store items for autonomous delivery. In other words, one or more of the vehicles 10-16 may include compartments or cargo bays in which items may be securely stored for transportation and delivery. Such vehicles may be directed by the central management system 130 to pickup locations where one or more items are placed and stored in the cargo bays and then directed to one or more drop off locations along a service route for delivery. For example, an individual may send a request for delivery 40 to the computing environment 110 via the network 150. Among other information, the request 40 may include a pickup location 41, a destination location 42, and description of an item to be delivered. The pickup and destination locations 41 and 42 may be embodied in the form of geolocation information (e.g., latitude, longitude, etc.). In turn, the central management system 130 may direct the vehicle 15, for example, to stop for pickup of the item at the pickup location 41 and deliver the item to the delivery location 42. The central management system 130 may also verify a recipient of the item at or near the delivery location 42 and permit access to (e.g., unlock) the cargo bay or compartment of the vehicle 15 in which the item is stored.

As noted above, the autonomous transportation networks described herein may address one or more of the limitations of public transportation systems. The autonomous transportation networks provide transportation service to and from nearly any location, generate optimized routes for several vehicles in a network of transportation vehicles, for efficiency, while accounting for service level parameters that vary over time. Further, in addition to transporting passengers, the autonomous transportation networks may be relied upon to transport tangible items, goods, groceries, etc.

Figure 2:
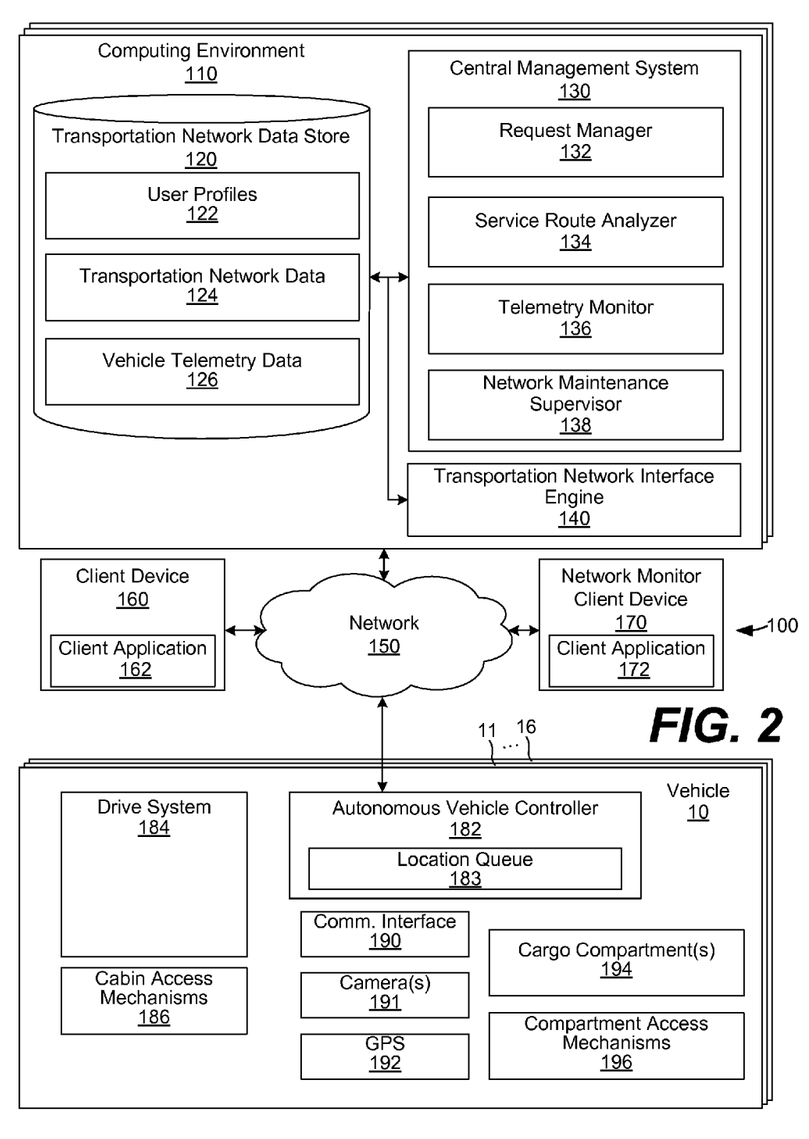
FIG. 2 illustrates a more detailed view of the networked environment for autonomous transportation in FIG. 1 according to various example embodiments of the present disclosure.

Turning to FIG. 2, a more detailed view of the networked environment 100 in FIG. 1 is illustrated. Beyond the computing environment 110, the network 150, and the vehicles 10-16 illustrated in FIG. 1, FIG. 2 illustrates client devices 160 and a network monitor client device 170. Referring to the computing environment 110, FIG. 2 illustrates user profiles 122, transportation network data 124, and vehicle telemetry data 126, among other data that may be stored in the transportation network data store 120. FIG. 2 also illustrates a request manager 132, service route analyzer 134, telemetry monitor 136, and network maintenance supervisor 138 of the central management system 130, and a transportation network interface engine 140 of the computing environment 110. Referring to the vehicle 10, which is representative of the other vehicles 11-16, FIG. 2 illustrates an autonomous vehicle controller 182 including a location queue 183, a drive system 184, a cabin access mechanism 186, a communications interface 190, one or more cameras 191, a global positioning system (GPS) receiver 192, one or more cargo compartments 194, and a compartment access mechanism 196 of the vehicle 10.

It should be appreciated that the components of the computing environment 110 and the vehicle 10 in FIG. 2 are representative and not intended to be exhaustive or limiting. The computing environment 110 and the vehicle 10 may include additional and/or alternative features, elements, or components than those illustrated in FIG. 2.

The computing environment 110 may be embodied as one or more computers, computing devices, or computing systems. In certain embodiments, the computing environment 110 may include one or more computing devices arranged, for example, in one or more server or computer banks. The computing device or devices may be located at a single installation site or distributed among different geographical locations. As further described below in connection with FIG. 6, the computing environment 110 may include a plurality of computing devices that together embody a hosted computing resource, a grid computing resource, and/or other distributed computing arrangement. In some cases, the computing environment 110 may be embodied as an elastic computing resource where an allotted capacity of processing, network, storage, or other computing-related resources varies over time. The computing environment 110 may also be embodied, in part, as various functional and/or logic (e.g., computer-readable instruction, device, circuit, processing circuit, etc.) elements configured to direct the computing environment 110 to perform aspects of the embodiments described herein. The operation of the individual components of the computing environment 110 is described in further detail below.

The network 150 may include the Internet, intranets, extranets, wide area networks (WANs), local area networks (LANs), wired networks, wireless (e.g., cellular, 802.11-based (Wi-Fi), Bluetooth®, etc.) networks, cable networks, satellite networks, other suitable networks, or any combinations thereof. It is noted that the computing environment 110 may communicate with the client devices 160, the network monitor client device 170, and the vehicles 10-16 using various systems interconnect models and/or protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or other protocols for communicating data over the network 150, without limitation. It is noted here that, although not illustrated, the network 150 may include connections to any number of network hosts, such as website servers, file servers, networked computing resources, databases, data stores, or any other network or computing architectures.

The client device 160 is representative of one or more client devices that may be relied upon by individuals to request transportation and/or delivery services. The client device 160 may be embodied as any type of computing device, processing circuit, or processor based device or system used by individuals, including those embodied in the form of a desktop computer, a laptop computer, a personal digital assistant, a cellular telephone, or a tablet computer, among others. The client device 160 may include one or more system devices or subsystems, such as wireless communications transceivers, GPS receivers, orientation and acceleration sensors, etc. The client device 160 may also include one or more peripheral devices. In this context, the peripheral devices may include one or more input devices, such as a keyboard, keypad, touch pad, touch screen, microphone, camera, etc.

As illustrated in FIG. 2, the client device 160 may execute applications, such as the client application 162. As further described below, the central management system 130 may provide data to the carrier client application 162, such as vehicle and/or cargo compartment identifiers, pickup, drop off, and delivery locations, estimated arrival, drop off, delivery, and delay times, service status messages, user verification information, etc. The central management system 130 may provide the data to the client application 162 via an applications interface and/or via one or more network pages. In one embodiment, the client application 162 may be embodied as a hypertext-based internet browser, such as Internet Explorer®, Firefox®, Chrome®, Silk®, or another type of browser, or a variant thereof, without limitation. Thus, the client application 162 may render network pages as webpages including user interfaces for interacting with the computing environment 110.

The network monitor client device 170 is representative of one or more client devices. The network monitor client device 170 may be embodied as any type of computing device, processing circuit, or processor based device or system, including those embodied in the form of a desktop computer, a laptop computer, a personal digital assistant, a cellular telephone, or a tablet computer, among others. The network monitor client device 170 may also include one or more peripheral devices for user interfacing. In this context, the peripheral devices may include one or more input devices, such as a keyboard, keypad, touch pad, touch screen, microphone, camera, etc.

As illustrated in FIG. 2, the network monitor client device 170 may execute applications, such as the client application 172. As further described below, the transportation network interface engine 140 may generate an interface, including one or more network pages, for example, to be rendered as a user interface on the client device 170, for directing the operation of the central management system 130 and the autonomous transportation network. In that context, the client application 172 may be embodied as a hypertext-based internet browser, such as Internet Explorer®, Firefox®, Chrome®, Silk®, or another type of browser, or a variant thereof, without limitation. Thus, the client application 172 may render the network page as a webpage including a user interface for interacting with the central management system 130.

Turning to the vehicle 10, the autonomous vehicle controller 182 may be embodied as analog, digital, or mixed analog and digital processing circuitry and memory that direct the operation of the vehicle 10 and the electromechanical drive system 184 of the vehicle 10. In that sense, the autonomous vehicle controller 182 is an example of an embedded real-time control system in which control outputs are produced in response to control input conditions. The control system 182 may include various sensors, such as cameras, laser Illuminated detection and ranging sensors (LIDAR), radar, etc., which may be relied upon to analyze the surroundings and develop control signals for operation of the drive system 184. Among embodiments, the autonomous vehicle controller 182 may perform the processing necessary to direct and operate the vehicle 10 alone or in tandem with other computing systems, including but not limited the drive system 184, the computing environment 110, and other computing devices and systems.

The autonomous vehicle controller 182 may include memory areas that store data relied upon for navigation of the vehicle 10, such as street image or view data, roadway data, navigation data, etc. The autonomous vehicle controller 182 is configured to rely upon feedback from its sensors and the drive system 184, for example, to develop an appropriate and suitable route for travel. The route may be determined primarily by the pickup, destination, and delivery locations communicated to the autonomous vehicle controller 182 from the central management system 130 and stored in the location queue 183 as described herein.

Among the embodiments, the autonomous vehicle controller 182 may be integrated with the drive system 184 of the vehicle 10 in any suitable manner to permit the autonomous vehicle controller 182 to control the operations of the vehicle 10, including but not limited to the acceleration, braking, turning, signal and lamp operation, etc. In that sense, the autonomous vehicle controller 182 may be electrically, mechanically, and electromechanically integrated with the drive system 184 and the other elements of the vehicle 10.

As illustrated in FIG. 2, the autonomous vehicle controller 182 includes the location queue 183. The location queue 183 may be embodied as a memory area where geographic locations or waypoints may be stored by the autonomous vehicle controller 182. The locations, such as pickup, destination, and delivery locations, may be communicated to the vehicle 10 from the central management system 130 (and stored separately by the central management system 130). Using the locations, the autonomous vehicle controller 182 may be configured to determine an appropriate and suitable route for the vehicle 10. When a destination is reached, a location may be removed from the location queue 183, and the vehicle 10 may proceed to the next location stored. Once provided with one or more locations by which a route may be determined, the autonomous vehicle controller 182 may operate independently (or at least substantially independently) from the central management system 130. In other words, as described herein, the primary concern of the central management system 130 is to direct and optimize routes of the vehicles 10-16, individually and collectively, in the autonomous transportation network, while the primary concern of the autonomous vehicle controller 182 is to direct the operation of the vehicle 10 according to the pickup, destination, and delivery locations provided by the central management system 130.

The drive system 184 may be embodied as the powertrain and associated electrical, mechanical, and electromechanical systems and associated control and diagnostic systems of the vehicle 10. Thus, the drive system 184 may include one or more engines, motors, transmissions, steering, braking, and other systems to control the movement of the vehicle 10 on surface streets, parking lots, etc. As noted above, the drive system 184 operates the vehicle 10 at the direction of the autonomous vehicle controller 182.

The cabin access mechanism 186 may be embodied as the mechanisms that control access to the passenger cabin of the vehicle 10, such as door locks, power doors, etc. In some embodiments, the cabin access mechanism 186 may be directed to lock, unlock, open, and close one or more doors to the passenger cabin of the vehicle 10 at the direction of the central management system 130.

The communications interface 190 may be embodied as one or more physical layer communications systems and associated software interfaces for communication between the vehicle 10 and the computing environment 110 via the network 150. In that context, the communications interface 190 may include one or more wired or wireless (e.g., cellular, satellite, Wi-Fi, Bluetooth®, etc.) communications interfaces. Among other data, the communications interface 190 may be relied upon to receive location information from the central management system 130, for example, and to communicate geolocation, telemetry, video, audio, and other data from the vehicle 10 to the central management system 130.

The cameras 191 may be embodied as one or more cameras having a field of view within the passenger cabin of the vehicle 10 and a field of view outside the vehicle 10. Using the cameras 191, still images and/or video may be relayed from the vehicle 10 to the computing environment 110, where it may be stored as part of the vehicle telemetry data 126. The images and video may be relied upon by the central management system 130 to control the operation of the autonomous transportation network and provide operators of the autonomous transportation network with operational awareness information. Thus, video monitoring and continuous recording may be relied upon for both the inside and outside of the vehicles 10-16. The GPS receiver 192 may be embodied as a receiver configured to receive and demodulate global positioning system beacons and identify the geographic location of the vehicles 10-16 as they move from place to place.

The cargo compartments 194 may be embodied as one or more compartments or cargo bays to store items for autonomous delivery. Using the cargo compartments 194, items may be securely stored for transportation and delivery by the vehicle 10. The cargo compartments 194 may be individually separated from each other, each having a separate access door, for example, similar to security lock boxes. Access to the doors may be controlled, individually, by the compartment access mechanisms 196. The compartment access mechanisms 196 may include mechanical or electromechanical locking, unlocking, and access mechanisms that permit controlled access to one or more of the cargo compartments 194. As further described below, the central management system 130 may direct the compartment access mechanisms 196 to unlock and/or open one or more of the cargo compartments 194 after verifying the identity of an intended recipient of an item or package stored therein. The verification may occur based on the exchange of a secret or other verification code, recipient client device authentication, facial or biometric recognition, or other means.

In various embodiments, the cargo compartments 194 of the vehicle 10 may vary in size for the transportation of larger or smaller items. The central management system 130 may store data representative of the passenger and cargo carrying capacity of the vehicle 10 and the number of passengers and items currently carried by the vehicle 10 over time, so that it can identify whether the vehicle 10 has available capacity to service requests for transportation and delivery. The cargo compartments 194 may be distinguished from the passenger compartment of the vehicle 10, which includes seating for passengers in the vehicle 10. It is noted that certain vehicles in a network of transportation vehicles may omit the cargo compartments 194 and instead be configured for the transportation of passengers only. Similarly, vehicles may omit passenger compartments and instead be configured for the transportation of items or packages only.

Turning to the computing environment 110, the transportation network data store 120 includes user profiles 122, transportation network data 124, and vehicle telemetry data 126. The user profiles 122 include data on various users or customers of the autonomous transportation network administered by the central management system 130. For example, the user profiles 122 may include actual or representative photographs or images, username and password combinations, name, address, and billing information, form of payment information, contact information, service history data, etc. Generally, when a user of the client device 160, for example, installs the client application 162 for the first time, the user may be requested to agree to certain terms and conditions and create an account with the computing environment 110. The account information for the user may be stored in the user profiles 122 for reference by the central management system 130.

The transportation network data 124 includes data related to one or more vehicles in a network of autonomous vehicles, such as the vehicles 10-16, among others. The transportation network data 124 may include unique vehicle identifier information (e.g. vehicle identification numbers (VINs), etc.), make, model, or other related vehicle information, passenger and/or cargo capacity information, service and/or maintenance history information, and other vehicle-related information. The transportation network data 124 may also include current location information for the vehicles 10-16. The location information may include global positioning data (e.g., latitude and longitude data), for example, received from the vehicles 10-16 over time.

The transportation network data 124 may also include service level parameters for the autonomous transportation network. The service level parameters may be defined as maximum or minimum service delay times, for example, or other similar service level metrics for the network. In other aspects, rather than or in addition to service delay times, the service level parameters may be related to operating and/or service charge costs, time of day, holiday, or event constraints, weather or meteorological conditions, road conditions, traffic, or other relevant factors. Thus, the central management system 130 may assign the vehicles 10-16 to requests for transportation or delivery service based on various operating and/or service level parameters.

The vehicle telemetry data 126 includes measurement and analysis data received from the autonomous vehicle controller 182 of the vehicle 10, for example, as well as from the other vehicles 11-16. This telemetry data may include on-board diagnostic (ODB) measurement data from the vehicles 10-16, such as diagnostic trouble codes, door open/closed indicator, fuel efficiency, vehicle speed, RPM, fuel level, trip data, oxygen sensor, on-board computer monitoring and testing, vehicle software version, emissions, radar sensor, and other data. Further, the vehicle telemetry data 126 may include still picture and/or video feed data captured from the cameras 191 of the vehicle 10, as well as from cameras of the other vehicles 11-16.

The central management system 130 includes the request manager 132, the service route analyzer 134, the telemetry monitor 136, and the network maintenance supervisor 138. The request manager 132 is configured to receive requests for transportation service, such as the request 30 in FIG. 1, or requests for delivery service, such as the request 40 in FIG. 1, from the client device 160. For passenger transportation service, the requests may include a user identifier or information by which a potential passenger may be identified, a pickup location, a destination location, a number of passengers, and other relevant information. For the transportation or delivery of items, the requests may include item identifiers, manifests, or other descriptive information, information by which the requester of the delivery service may be identified, a pickup location, a delivery off location, and other relevant information. The request manager 132 may be further configured to access the user profiles 122 to retrieve authorization and/or payment information associated with requests for transportation or delivery service based on the user identifier information in the requests.

For any given request, the service route analyzer 134 is configured to analyze a plurality of existing service routes to identify an existing service route and passenger capacity of a vehicle compatible with the request. For example, the service route analyzer 134 may analyze the existing service routes, if any, of the vehicles 10-16. Once a compatible vehicle is identified, the service route analyzer 134 may also estimate a delay to the existing service route of the vehicle with reference to the pickup, destination, and/or delivery locations of a request. In other words, if the vehicle is already operating according to an existing transportation and/or delivery route for passengers or items, the service route analyzer 134 may estimate a time delay or impact upon that existing route. The service route analyzer 134 may then determine whether that additional time delay is acceptable in view of the existing route. The determination may be made based on a comparison of the additional time delay with at least one service level parameter of the autonomous transportation network operated by the central management system 130, for example. Further details regarding service level parameters are described below with reference to the process flow diagrams in FIGS. 3A-3C.

When determining that the additional time delay is acceptable for a vehicle having an existing route that is compatible with the request, the request manager 132 may assign the vehicle to service the request and communicate the pickup, destination, and/or delivery locations to the vehicle. On the other hand, when determining that the additional time delay is unacceptable for the vehicle having the existing route, the request manager 132 may dispatch a new vehicle to join the autonomous transportation network to service the request. Thus, it should be appreciated that the service level parameters of the autonomous transportation network, which may be adjusted over time by a network operator using the network monitor client device 170, for example, may cause the request manager 132 to rely more heavily on vehicles having existing routes (e.g., ridesharing) or dispatch additional vehicles to increase service levels, depending upon factors related to operating and/or service charge costs, time of day, holiday, or event constraints, weather or meteorological conditions, road conditions, traffic, or other relevant factors.

The request manager 132 is further configured to process payment transactions associated with requests for transportation and delivery services. The request manager 132 may process the payment transactions based on billing information and/or payment information stored in the user profiles 122. The transactions may be processed at any suitable time, such as when a passenger is picked up or dropped off by a vehicle, when an item is picked up or delivered, or at any other time.

The telemetry monitor 136 is configured to monitor and analyze the vehicle telemetry data 126 received from the vehicles 10-16. In this context, the telemetry monitor 136 may be able to identify the potential for dangerous operating conditions of the vehicles 10-16 or dangerous activities of passengers, verify the occupancy and capacity of the vehicles 10-16, verify the location of the vehicles 10-16, provide a deterrent for crime, visually identify passengers and recipients of items, etc.

The network maintenance supervisor 138 is configured to oversee the maintenance of the vehicles 10-16 by reviewing and monitoring the vehicle telemetry data 126 to identify fuel levels, service mileage and operating hours, and other diagnostic information. Additionally, the network maintenance supervisor 138 is configured to receive maintenance requests from the vehicles 10-16. The maintenance requests may include requests for various types of maintenance or service for the vehicles 10-16. In response to the requests, the network maintenance supervisor 138 may direct one or more of the vehicles 10-16 to a location for maintenance and/or refueling, for example.

The computing environment 110 also includes the transportation network interface engine 140. The transportation network interface engine 140 may generate various network pages (or other interface elements) for display as a user interface on a client device, such as the network monitor client device 170. In one embodiment, the transportation network interface engine 140 may generate the network pages as hypertext-based pages including information about the operating status of the autonomous transportation network administered by the central management system 130. Further, the transportation network interface engine 140 may generate a user interface for the control and/or administration of the autonomous transportation network through one or more of the central management system 130 and the vehicles 10-16, individually.

Figure 3A:
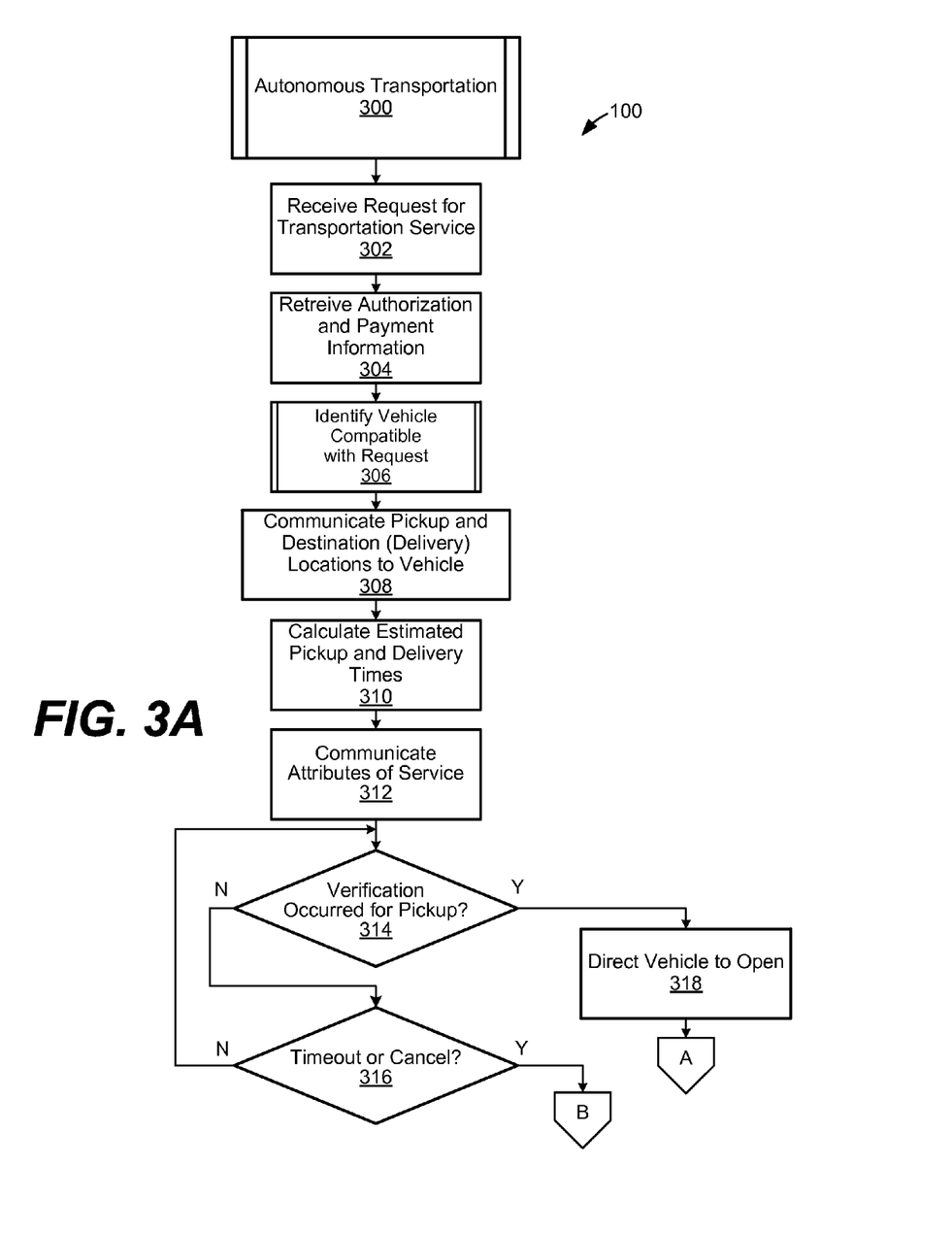
FIG. 3A illustrates a process of autonomous transportation performed in the networked environment in FIGS. 1 and 2 according to an example embodiment of the present disclosure.
Figure 3B:
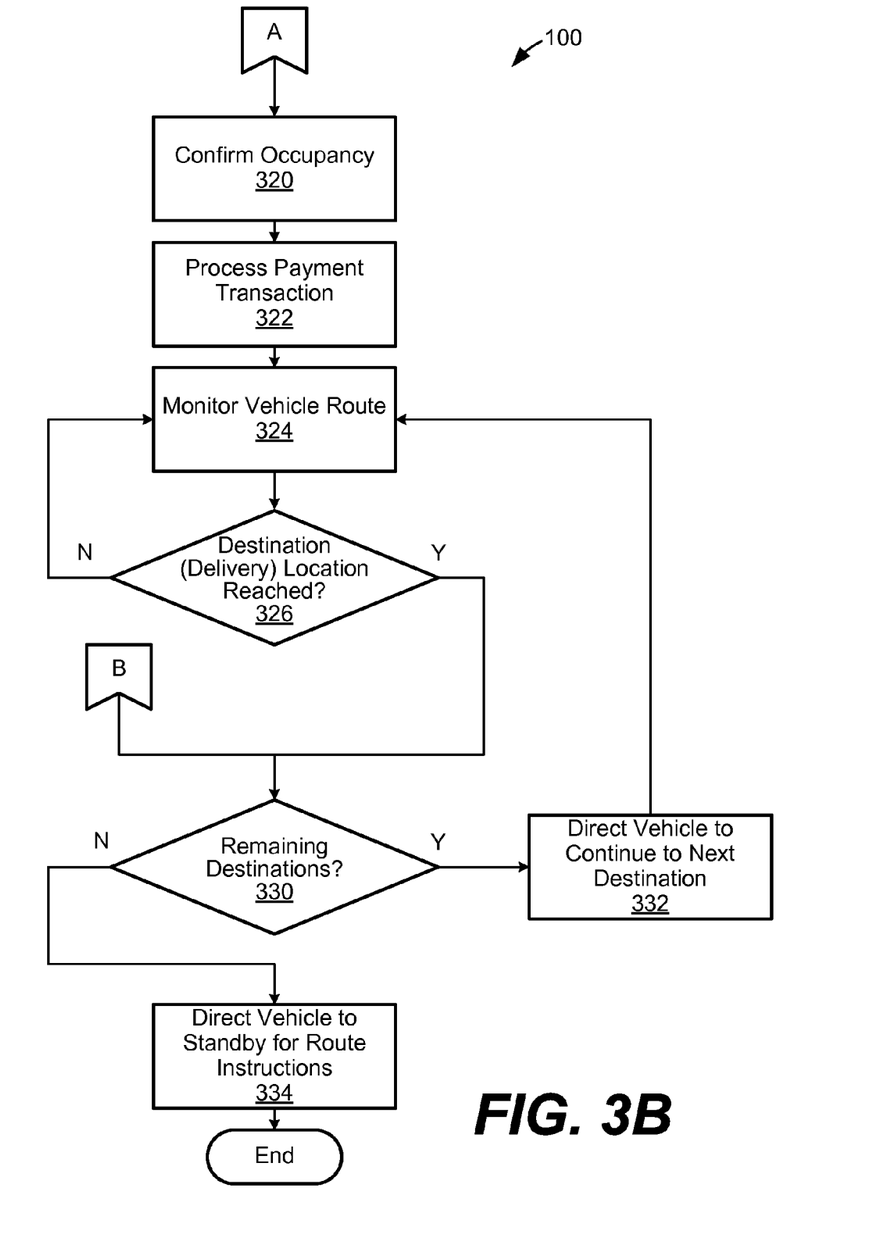
FIG. 3B further illustrates the process of autonomous transportation performed in the networked environment in FIGS. 1 and 2 according to an example embodiment of the present disclosure.
Figure 3C:
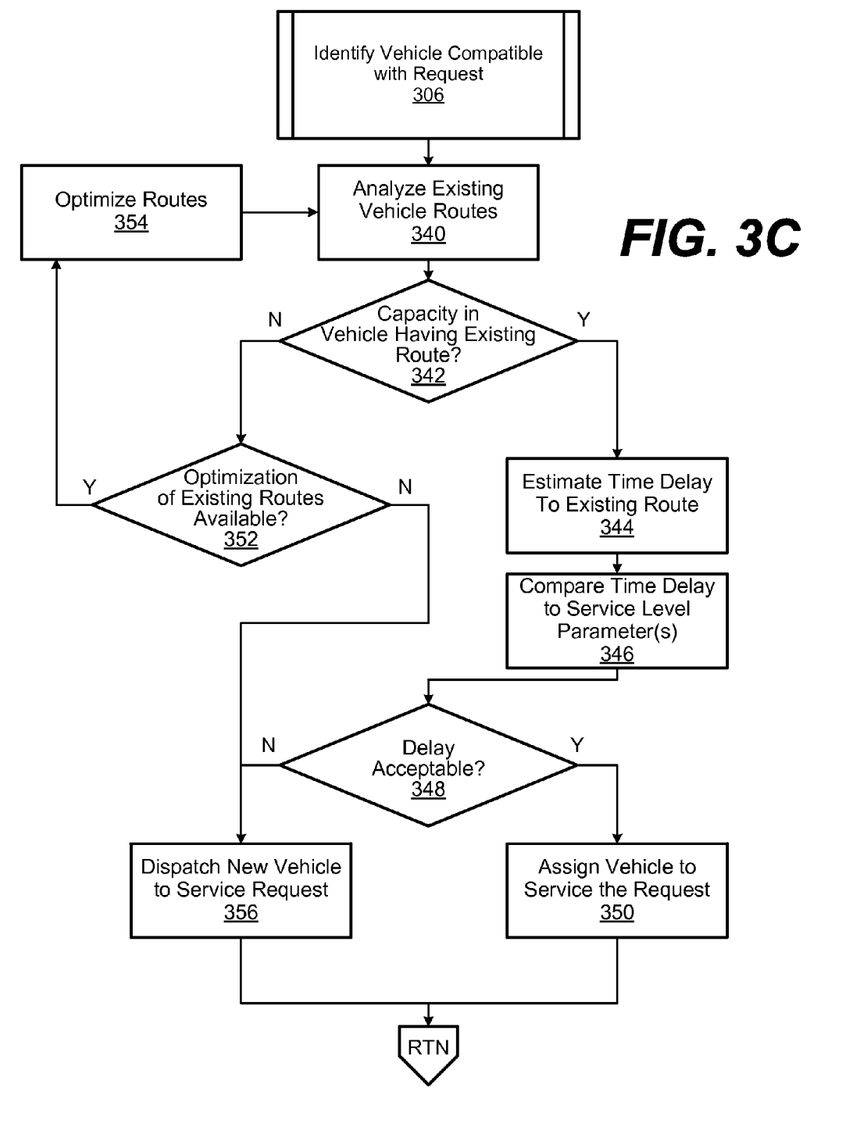
FIG. 3C further illustrates the process of autonomous transportation performed in the networked environment in FIGS. 1 and 2 according to an example embodiment of the present disclosure.

Turning to additional details on the operation of the computing environment 110 and the vehicles 10-16, FIGS. 3A-3C illustrate a process 300 of autonomous transportation performed in the networked environment 100 in FIGS. 1 and 2 according to an example embodiment of the present disclosure. In certain aspects, the flowcharts in FIGS. 3A-3C may be viewed as depicting an example group of steps performed in the networked environment 100 according to one or more embodiments. It should be appreciated that that the flowcharts in FIGS. 3A-3C provide merely one example of a functional sequence or arrangement that may be employed to implement the operations of the networked environment 100, as described herein. It is noted here that, although the process 300 is described in connection with the computing environment 110 and the vehicles 10-16 in FIGS. 1 and 2, other environments and/or vehicles may perform the process 300.

Referring first to FIG. 3A, at reference numeral 302, the process 300 includes receiving a request for transportation or delivery service from the client device 160. For example, as illustrated in FIG. 1, the central management system 130 may receive a request for transportation 30 from a potential passenger. The central management system 130 may also receive a request for delivery 40 of one or more items at reference numeral 302. Depending upon the form of the request, it may include a user identifier, pickup location, destination location, delivery location, number of passengers, item identifiers, manifests, or other descriptive information. It is also noted that the central management system 130 may receive a request to modify a previous request. Such a modified request may include modified pickup, destination, and/or delivery locations, or other descriptive information. Further, the central management system 130 may receive telemetry data from the vehicles 10-16 throughout the process 300, as illustrated in FIGS. 3A and 3B. The telemetry data may be relied upon by the central management system 130 to make various decisions, as described herein.

At reference numeral 304, the process 300 includes retrieving authorization and/or payment information associated with the request. The authorization and/or payment information may be retrieved by the central management system 130 from the user profiles 122, for example, based on the user identifier information in the request. The user identifier information may include photographs, username and/or password combinations, name and/or address information, etc., and the authorization information may include billing or payment information, for example. Generally, at reference numeral 304, the central management system 130 retrieves the information necessary from the transportation network data store 120 to determine whether the request is valid, corresponds to a recognized user, and is associated with billing and/or payment information. If no valid information associated with the request is retrieved at reference numeral 304, the process 300 may return an error message to the client device 160.

At reference numeral 306, the process 300 includes identifying a vehicle in the transportation network compatible with the request received at reference numeral 302. The process of identifying the vehicle is described in further detail below with reference to FIG. 3C.

Once the vehicle is located, at reference numeral 308, the process 300 includes communicating pickup, destination, and/or delivery locations to the vehicle. For example, as described above with reference to FIG. 1, the central management system 130 may communicate the pickup and drop off locations 31 and 32 to the vehicle 12 based on the request for transportation 30. The vehicle 12 may store the pickup and drop off locations 31 and 32 into its location queue memory 183 and autonomously update its route 22 to incorporate the pickup and drop off locations 31 and 32.

At reference numeral 310, the process 300 includes calculating an estimated pickup time until the vehicle arrives at the pickup location. For example, as described above with reference to FIG. 1, the central management system 130 may calculate an estimated time until the vehicle 12 arrives at the pickup location 31 or until the vehicle 15 arrives at the pickup location 41. The pickup time may be estimated based on various factors, such as the current distances between the vehicles and the pickup locations, current or anticipated traffic conditions, the types of the vehicles, etc. At reference numeral 310, the process 300 may also include calculating an estimated time until the vehicle arrives at a destination or delivery location. Again, the central management system 130 may calculate the estimated destination or delivery times based on various factors, such as the current distances between the vehicles and the destination or delivery locations, current or anticipated traffic conditions, the types of the vehicles, etc.

At reference numeral 312, the process 300 includes communicating the attributes of fulfillment of the request for service to the client device 160. In other words, after the central management system 130 has assigned a vehicle to service the request received at reference numeral 302 and estimated the associated pickup, drop off, and/or delivery times, the central management system 130 may communicate that information to the client device 160. Thus, at reference numeral 312, the central management system 130 may communicate a vehicle identifier of one of the vehicles 12 or 15 (or any of the vehicles 10-16, if assigned), for example, and the estimated pickup, drop off, and/or delivery times to the client device 160. In that way, the user of the client device 160 may be informed that his request for transportation or delivery service has been received and fulfilled. Also, the user may have information as to how long before he should expect to be picked up and dropped off. Alternatively, the user may have information as to how long before an item will be picked up and delivered.

At reference numeral 314, the process 300 includes determining whether a user or client device verification has occurred for pickup. The verification may include verifying a user of the client device 160 (or the client device 160 itself) at the vehicle 12. In some implementations, verification may occur in an unobtrusive manner. For example, when the vehicle 12 approaches the pickup location 31, the vehicle 12 and the client device 160 may automatically exchange an authentication token using radio frequency communications (e.g., Bluetooth®, near field communication, etc.), without the need for user interaction. In other implementations, when the vehicle 12 approaches the pickup location 31, the central management system 130 may send a verification code to the client device 160. The user of the client device 160 may be asked to enter the verification code into an input device at the vehicle 12. Rather than a verification code, the user may be asked to enter a pre-defined password, scan a fingerprint, or pose for a facial recognition scan.

In other embodiments, the central management system 130 may forward a bar or quick response (QR) code to the client device 160, for display. When vehicle 12 approaches the user of the client device 160, the user may present the bar or QR code, displayed on the client device 160, to a scanner of the vehicle 12. In either case, the vehicle 12 may communicate with the central management system 130 to compare and verify the verification code, password, fingerprint or facial scan, or scanned bar or QR code with expected verification information stored in the user profiles 122. If verified, then the process 300 proceeds to reference numeral 318. Otherwise, the process 300 waits at reference numeral 316 for at least a reasonable period of time for a pickup verification to occur before the pickup is cancelled. It is also noted that, if the process 300 times out while waiting for verification of a pickup at reference numeral 316 in FIG. 3A, the process 300 continues on to reference numeral 330 in FIG. 3B.

At reference numeral 318, the process 300 includes directing the vehicle to open. For example, after verification occurs at reference numeral 314, the central management system 130 may send an instruction to the vehicle 12 to unlock and/or open a passenger compartment door of the vehicle 12. Once opened, the user of the client device 160, as a passenger, may enter the passenger cabin of the vehicle 12 and wait to be transported to his destination. Alternatively, if responding to a request for transportation of an item, the central management system 130 may send an instruction to the vehicle 12, for example, to direct the compartment access mechanism 196 to unlock and/or open a door of one of the cargo compartments 194. Once opened, an item may be stored in one of the cargo compartments 194. In either case, the vehicle may pick up a passenger or item for transportation or delivery.

Turning to FIG. 3B, at reference numeral 320, the process 300 may include confirming the occupancy of the vehicle. That is, the central management system 130 may review data from the cameras 191, seat weight sensors integrated with the seats in the vehicle 12, or telemetry data from other sensors in the vehicle 12 to determine whether a passenger or item was picked up. If not confirmed, the process 300 may take remedial actions, such as attempting to find the pickup location, sending error messages to the client device 160, etc. In some embodiments, the process at reference numeral 320 may be omitted.

At reference numeral 322, the process 300 includes processing a payment transaction for the transportation or delivery service. In that context, the request manager 132 may process the payment transaction based on billing information and/or payment information stored in the user profiles 122. The transaction may be processed at another timing during the process 300 rather than that illustrated, such as when a passenger is picked up or dropped off, when an item is picked up or delivered, or at any other suitable time. In certain aspects of the embodiments, the costs for the service may vary based on demand, time of day, holiday, or event constraints, weather, and/or other cost or environmental factors. The payment transactions may be cleared through credit card or other bank processing facilities.

At reference numeral 324, the process 300 includes monitoring the route of the vehicle assigned to the request received at reference numeral 302. Here, the central management system 130 may monitor the route of the vehicle 12 (or other vehicles), for example, to determine its progress. The central management system 130 may also monitor whether the vehicle 12 has met estimated pickup, drop off, and/or delivery times. Further, the telemetry monitor 136 may monitor the operating status of the vehicle 12 as it continues along its route.

At reference numeral 326, the process 300 includes determining whether the vehicle assigned to service the request received at reference numeral 302 has reached its destination or delivery location. For example, the central management system 130 may determine whether the vehicle 12 has arrived at the destination location 32. If so, before continuing on, the central management system 130 may also determine whether the passenger has exited the vehicle 12 at the location 32. The central management system 130 may communicate a confirmation message or a receipt, for example, to the client device 160. As another example in the context of an item delivery, the central management system 130 may determine whether the vehicle 15 has arrived at the delivery location 42. If so, the central management system 130 may await for the verification of the recipient of the item, similar to the type of verification that occurred at reference numeral 314. If verified, then the central management system 130 may direct the compartment access mechanism 196 to unlock and/or open the compartment holding the item. As illustrated, if the vehicle assigned to service the request has reached (e.g., completed) its destination and completed a drop off, the process 300 proceeds to reference numeral 330. Otherwise, the process 300 proceeds back to reference numeral 324 for continued monitoring.

At reference numeral 330, the process 300 includes determining whether the vehicle assigned to the request has remaining drop off or delivery locations. If so, then the central management system 130 may direct the vehicle to continue on to its next destination at reference numeral 332, if the vehicle does not automatically continue. Otherwise, the central management system 130 may direct the vehicle to standby or park at a certain location to wait for further route instructions at reference numeral 334.

Turning to FIG. 3C, the process of identifying a vehicle compatible with the request received at reference numeral 302 is described in additional detail. The process flow illustrated in FIG. 3C may be considered part of the overall process 300 among FIGS. 3A-3C.

At reference numeral 340, the process includes analyzing a plurality of existing service routes for an existing service route compatible with the request received at reference numeral 302. Here, the service route analyzer 134 may analyze the routes of the vehicles 10-16 (FIG. 1) to identify one which is best suited or most compatible with the request. The service route analyzer 134 may be configured to identify an existing vehicle route that is most closely aligned with the pickup, drop off, and/or delivery locations in the request, for efficiency. Once a vehicle is identified, the process 300 proceeds to reference numeral 342, which includes determining whether the passenger and/or cargo capacity of the identified vehicle is compatible with the request. Here, the central management system 130 may determine whether the vehicle has sufficient passenger or cargo capacity to handle the number of passengers or items identified in the request for transportation. If so, then the process proceeds to reference numeral 344.

At reference numeral 344, the process 300 includes estimating a delay to the existing service route of the identified vehicle with reference to the pickup, destination, and/or delivery locations in the request. That is, the vehicle may already be operating according to an existing transportation and/or delivery route for passengers or items. In that context, the service route analyzer 134 may estimate a time delay or impact upon that existing route based on the additional request. The service route analyzer 134 may then determine whether that additional time delay is acceptable for the passengers or items being serviced according to the existing route at reference numeral 346.

At reference numeral 346, the process 300 includes comparing the time delay with one or more service level parameters of the autonomous transportation network. The service route analyzer 134 may compare the time delay with service level parameters to determine if the delay is consistent with the expectations of the other passengers in the vehicle or the delivery commitments for items to be delivered. The service level parameters may be defined as maximum or minimum service delay times, for example, or other similar service level metrics. In other aspects, rather than or in addition to service delay times, the service level parameters may be related to operating and/or service charge costs, time of day, holiday, or event constraints, weather or meteorological conditions, road conditions, traffic, or other relevant factors.

After the comparison against the service level parameters at reference numeral 346, the process 300 proceeds to reference numeral 348, which includes determining whether the delay is acceptable according to the one or more service level parameters. If so, then the process 300 proceeds to reference numeral 350, where the identified vehicle is finally assigned to service the request received at reference numeral 302 (FIG. 3A). Otherwise, if the delay is not acceptable according to the one or more service level parameters, then the process proceeds to reference numeral 356, which includes dispatching a new vehicle (e.g., a vehicle which has no existing route) to service the request.

Referring back to reference numeral 342, if it is determined that there are no existing routes of vehicles compatible with the request received at reference numeral 302, either because of a relatively large distance to the pickup, drop off, or delivery locations, lack of available passenger or cargo capacity, etc., the process 300 proceeds to reference numeral 352, which includes determining whether an optimization of existing routes of the vehicles in the transportation network is available. In that context, the service route analyzer 134 may determine whether the routes of one or more of the vehicles 10-16, for example, may be optimized, for efficiency or increased service capacity. An optimization may include a rearrangement of the pickup, drop off, and/or delivery locations among the vehicles 10-16, based on the need to handle additional service requests or to achieve some other efficiency or service metric. If optimization is available, the process 300 proceeds to reference numeral 354, which includes the service route analyzer 134 optimizing the existing service routes among the vehicles 10-16 in the network of transportation vehicles. Otherwise, the process 300 proceeds to reference numeral 356, which includes dispatching a new vehicle. It should be appreciated that, if no optimization is available and no additional vehicles are available to be dispatched, a request received at reference numeral 302 may be denied in certain cases.

The process 300 may be relied upon to address the problems discussed above by offering on-demand transportation service to and from nearly any location accessible by way of surface streets. The central management system 130 may optimize routes of the vehicles 10-16, among others, in a network of transportation vehicles, for efficiency, while accounting for service level parameters that vary and be defined by operators over time. It is noted that an operator may control or direct the operation of the process 300 through the network monitor client device 170 and the transportation network interface engine 140, throughout the process 300. Further, vehicles may be added to—and removed from—the network of vehicles based on current service demands, avoiding wasted resources when demand is low.

Figure 4:
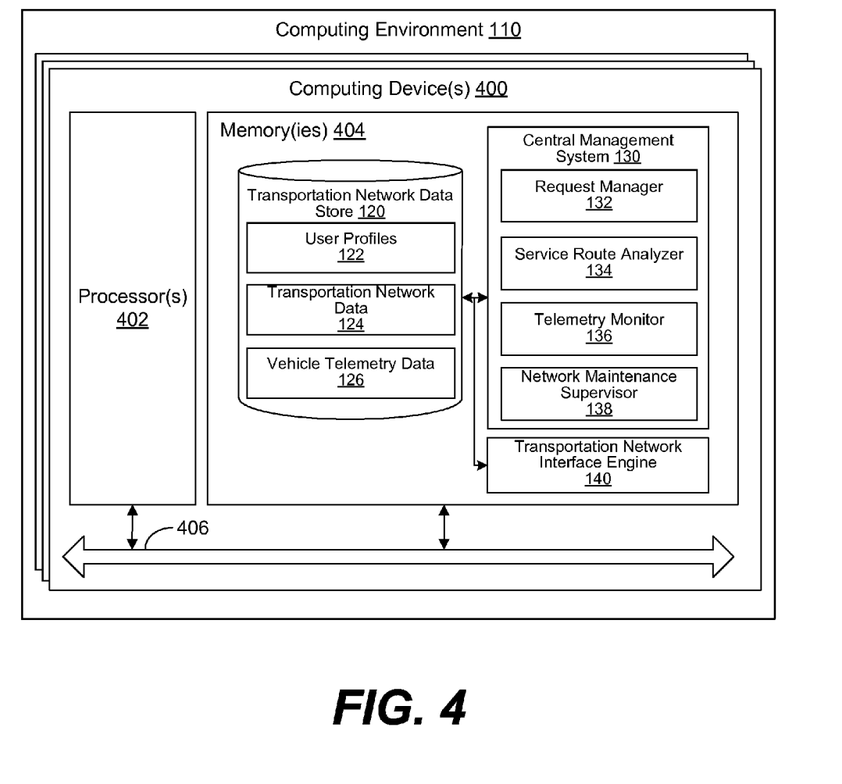
FIG. 4 illustrates an example schematic block diagram of the computing environment employed in the networked environment of FIG. 2 according to various embodiments of the present disclosure.

FIG. 4 illustrates an example schematic block diagram of the computing environment 110 employed in the networked environment 100 of FIGS. 1 and 2 according to various embodiments of the present disclosure. The computing environment 110 includes one or more computing devices 400. Each computing device 400 includes at least one processing system, for example, having a processor 402 and a memory 404, both of which are electrically and communicatively coupled to a local interface 406. To this end, each computing device 400 may be embodied as, for example, at least one server computer or similar device. The local interface 406 may be embodied as, for example, a data bus with an accompanying address/control bus or other bus structure as can be appreciated.

In various embodiments, the memory 404 stores data and software or executable-code components executable by the processor 402. For example, the memory 404 may store executable-code components associated with the central management system 130 for execution by the processor 402. The memory 404 may also store data such as that stored in the transportation network data store 120, among other data.

It should be understood and appreciated that the memory 404 may store other executable-code components for execution by the processor 402. For example, an operating system may be stored in the memory 404 for execution by the processor 402. Where any component discussed herein is implemented in the form of software, any one of a number of programming languages may be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 404 stores software for execution by the processor 402. In this respect, the terms "executable" or "for execution" refer to software forms that can ultimately be run or executed by the processor 402, whether in source, object, machine, or other form. Examples of executable programs include, for example, a compiled program that can be translated into a machine code format and loaded into a random access portion of the memory 404 and executed by the processor 402, source code that can be expressed in an object code format and loaded into a random access portion of the memory 404 and executed by the processor 402, or source code that can be interpreted by another executable program to generate instructions in a random access portion of the memory 404 and executed by the processor 402, etc. An executable program may be stored in any portion or component of the memory 404 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, the memory 404 may include both volatile and nonvolatile memory and data storage components. Volatile components are those that do not retain data values upon loss of power. Nonvolatile components are those that retain data upon a loss of power. Thus, the memory 404 may include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may include, for example, a static random access memory (SRAM), dynamic random access memory (DRAM), or magnetic random access memory (MRAM), and/or other similar memory device. The ROM may include, for example, a programmable read-only memory (PROM), erasable programmable read-only memory (EPROM), electrically erasable programmable read-only memory (EEPROM), or other similar memory device.

Also, the processor 402 may represent multiple processors 402 and/or multiple processor cores and the memory 404 may represent multiple memories that operate in parallel, respectively, or in combination. Thus, the local interface 406 may be an appropriate network or bus that facilitates communication between any two of the multiple processors 402, between any processor 402 and any of the memories 404, or between any two of the memories 404, etc. The local interface 406 may include additional systems designed to coordinate this communication, including, for example, a load balancer that performs load balancing. The processor 402 may be of electrical or of some other available construction.

As discussed above, the central management system 130 may be embodied, in part, by software or executable-code components for execution by general purpose hardware. Alternatively, the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart or process diagrams in FIGS. 3A-3C are representative of certain processes, functionality, and operations of embodiments discussed herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 402. The machine code may be converted from the source code, etc. Further, each block may represent, or be connected with, a circuit or a number of interconnected circuits to implement a certain logical function or process step.

Although the flowchart or process diagrams in FIGS. 3A-3C illustrate a specific order, it is understood that the order may differ from that which is depicted. For example, an order of execution of two or more blocks may be scrambled relative to the order shown. Also, two or more blocks shown in succession in FIGS. 3A-3C may be executed concurrently or with partial concurrence. Further, in some embodiments, one or more of the blocks shown in FIGS. 3A-3C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including central management system 130 that are embodied, at least in part, by software or executable-code components, may be embodied or stored in any tangible or non-transitory computer-readable medium or device for execution by an instruction execution system such as a general purpose processor. In this sense, the logic may be embodied as, for example, software or executable-code components that can be fetched from the computer-readable medium and executed by the instruction execution system. Thus, the instruction execution system may be directed by execution of the instructions to perform certain processes such as those illustrated in FIGS. 3A-3C. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium may include a RAM including, for example, an SRAM, DRAM, or MRAM. In addition, the computer-readable medium may include a ROM, a PROM, an EPROM, an EEPROM, or other similar memory device.

Further, any logic or application(s) described herein, including the adaptive topic logic, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 110. Additionally, it is understood that terms such as "application," "service," "system," "engine," "module," and so on may be interchangeable and are not intended to be limiting.

Disjunctive language, such as the phrase "at least one of X, Y, or Z," unless specifically stated otherwise, is to be understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying at least one program executable in at least one computing device, the at least one program having instructions that direct the at least one computing device to perform a method comprising:
   receiving a request to transport an item from a first client device, the request including a pickup location, a delivery location, and an item description;
   based on at least one of the pickup location, the delivery location, and the item description, identifying a vehicle and an existing service route compatible with the request;
   estimating a delay associated with transporting the item in the identified vehicle along at least a portion of the existing service route;
   determining whether the estimated delay is acceptable based on a comparison of the estimated delay with at least one service level parameter;
   in response to determining that the estimated delay is acceptable, sending the vehicle to the pickup location to receive the item;
   communicating the delivery location to the vehicle and calculating an estimated delivery time until the vehicle arrives at the delivery location; and
   communicating the estimated delivery time, a vehicle identifier, and a cargo compartment identifier to a second client device.

2. The non-transitory computer-readable medium of claim 1, wherein the method further comprises, in response to determining that the estimated delay is unacceptable, dispatching an additional vehicle to join a transportation network and service the request.

3. The non-transitory computer-readable medium of claim 1, wherein the method further comprises:
   communicating an access code for a cargo compartment of the vehicle to the second client device;
   verifying the access code near the delivery location; and
   directing the cargo compartment of the vehicle to open based on the verifying.

4. A system, comprising:
   at least one computing device configured to perform a method comprising:
      receiving a request from a first client device to transport an item, the request comprising a pickup location and a delivery location;
      identifying a vehicle in a transportation network having cargo capacity compatible with the request, the identified vehicle operating along an existing service route;
      estimating a delay to the existing service route of the identified vehicle based on the pickup location and the delivery location and determining whether the estimated delay is acceptable;
      in response to determining that the estimated delay is acceptable, assigning the vehicle to service the request;
      communicating the pickup location and the delivery location to the identified vehicle based on the request;
      calculating an estimated delivery time until the vehicle arrives at the delivery location; and
      communicating the estimated delivery time to a second client device.

5. The system of claim 4, wherein the pickup location and the a delivery location comprise geolocation latitude and longitude location information, and the request further includes an item description.

6. The system of claim 5, wherein identifying the vehicle comprises analyzing the existing service route and cargo capacity of each of a plurality of vehicles for compatibility with the pickup location, the delivery location, and the item description.

7. The system of claim 4, wherein the method further comprises optimizing a plurality of existing service routes of a plurality of vehicles in the transportation network to meet at least one service level parameter of the transportation network.

8. The system of claim 4, wherein estimating the delay further comprises estimating a drop off delay to a passenger on the identified vehicle.

9. The system of claim 4, wherein determining whether the estimated delay is acceptable comprises determining whether the estimated delay is acceptable based on a comparison of the estimated delay with at least one service level parameter of the transportation network.

10. The system of claim 9, wherein the method further comprises, in response to determining that the estimated delay is unacceptable, dispatching an additional vehicle to join the transportation network and service the request.

11. The system of claim 4, wherein the method further comprises receiving telemetry data from the vehicle, the telemetry data including at least one of a fuel level, system diagnostic data, cargo capacity data, or video monitoring data.

12. The system of claim 4, wherein the method further comprises:
   communicating an access code to access the item from the vehicle to the second client device;
   verifying the access code near the delivery location; and
   directing a cargo compartment of the vehicle to open based on the verifying.

13. A method, comprising:
   analyzing, by at least one computing device, a plurality of existing service routes of a plurality of vehicles in a transportation network for an existing service route and capacity of a vehicle compatible with a request for service received from a client device;
   estimating, by the at least one computing device, a delay to the existing service route of the vehicle to service the request and determining whether the estimated delay is acceptable;
   in response to determining that the estimated delay is acceptable, communicating, by the at least one computing device, a delivery location to the vehicle based on the request;
   calculating, by the at least one computing device, an estimated delivery time until the vehicle arrives at the delivery location; and
   communicating, by the at least one computing device, the delivery time to the client device.

14. The method according to claim 13, wherein:
   the request comprises a pickup location and the delivery location;
   estimating the delay comprises estimating, by the at least one computing device, the delay to the existing service route of the vehicle with reference to the pickup location and the delivery location of the request; and
   determining whether the delay is acceptable comprises determining, by the at least one computing device, whether the delay is acceptable based on a comparison of the delay with at least one service level parameter.

15. The method according to claim 14, further comprising processing, by the at least one computing device, a payment transaction associated with the request.

16. The method according to claim 13, further comprising:
   communicating, by the at least one computing device, an access code for a cargo compartment of the vehicle to a second client device;
   verifying, by the at least one computing device, the access code near the delivery location; and
   directing, by the at least one computing device, the cargo compartment of the vehicle to open based on the verifying.

17. The method according to claim 13, further comprising optimizing, by the at least one computing device, the plurality of existing service routes in the transportation network to meet at least one service level parameter of the transportation network.

18. The method according to claim 13, further comprising receiving, by the at least one computing device, telemetry data from the vehicle, the telemetry data including at least one of fuel level, system diagnostic, cargo capacity, or video monitoring data.

19. The method according to claim 13, further comprising establishing, by the at least one computing device, at least one user interface element representative of at least one of the plurality of existing service routes of the plurality of vehicles in the transportation network.

20. The method according to claim 13, further comprising:
   receiving, by the at least one computing device, a maintenance request from the vehicle, the maintenance request including at least one request for maintenance of the vehicle; and
   directing, by the at least one computing device, the vehicle to a location for maintenance based on the maintenance request.

* * * * *